(12) United States Patent
Britcher et al.

(10) Patent No.: US 10,124,303 B2
(45) Date of Patent: Nov. 13, 2018

(54) APPARATUS AND METHODS FOR DISPENSING SMALL BEADS OF VISCOUS MATERIAL

(71) Applicant: Nordson Corporation, Westlake, OH (US)

(72) Inventors: James Britcher, Livonia, MI (US);
David W. Groat, Canton, MI (US);
Thomas R. Tudor, Westland, MI (US);
Herman E. Turner, Jr., Plymouth, MI (US)

(73) Assignee: Nordson Corporation, Westlake, OH (US)

( * ) Notice: Subject to any disclaimer, the term of this patent is extended or adjusted under 35 U.S.C. 154(b) by 73 days.

(21) Appl. No.: 14/826,534

(22) Filed: Aug. 14, 2015

(65) Prior Publication Data
US 2016/0067656 A1   Mar. 10, 2016

Related U.S. Application Data

(60) Provisional application No. 62/046,499, filed on Sep. 5, 2014.

(51) Int. Cl.
*B01F 5/00* (2006.01)
*B05C 5/02* (2006.01)
(Continued)

(52) U.S. Cl.
CPC .......... *B01F 5/0077* (2013.01); *B01F 5/0085* (2013.01); *B05C 5/0225* (2013.01);
(Continued)

(58) Field of Classification Search
CPC .... G01F 11/021; G01F 11/029; B01F 5/0077; B01F 5/0085; B01F 5/008; B05C 5/0225;
(Continued)

(56) References Cited

U.S. PATENT DOCUMENTS 3,684,250 A * 8/1972 Roeser ................ B01F 15/0237
366/160.4
4,012,247 A * 3/1977 Eigenmann ........... E01C 23/166
156/71
(Continued)

FOREIGN PATENT DOCUMENTS

EP    0443611 A2   8/1991
WO   0040342 A1   7/2000
(Continued)

OTHER PUBLICATIONS

European Application No. 15182999: Extended European Search Report dated Jan. 16, 2015, 11 pages.

*Primary Examiner* — Nicholas J Weiss
*Assistant Examiner* — Andrew P Bainbridge
(74) *Attorney, Agent, or Firm* — Baker & Hostetler LLP

(57) ABSTRACT

Apparatus and methods for dispensing small beads of a viscous, mixed fluid material formed by first and second viscous fluids. The apparatus includes first and second metering rods for moving in a reciprocating manner, such that the first metering rod extends into a first fluid passageway, and the second metering rod extends into a second fluid passageway. A mixing passage communicates with the first and second fluid passageways to receive the first and second viscous fluids from the first and second fluid passageways. A dispensing passageway is in fluid communication with the mixing passage, and dispenses a small bead of viscous, mixed fluid material formed by the mixed first and second viscous fluids. A control retracts the first and second metering rods to prevent drooling of the viscous, mixed fluid material from the dispensing passageway after a dispensing cycle.

20 Claims, 4 Drawing Sheets

(51) Int. Cl.
  *B05C 11/10* (2006.01)
  *B05C 9/10* (2006.01)
  *G01F 11/02* (2006.01)
  *B05C 17/005* (2006.01)
  *B05C 17/01* (2006.01)

(52) U.S. Cl.
  CPC .......... *B05C 5/0233* (2013.01); *B05C 5/0237* (2013.01); *B05C 9/10* (2013.01); *B05C 11/1036* (2013.01); *G01F 11/021* (2013.01); *B05C 17/00553* (2013.01); *B05C 17/014* (2013.01)

(58) Field of Classification Search
  CPC ....... B05C 5/0233; B05C 5/0237; B05C 9/10; B05C 11/1036; B05C 17/00553; B05C 17/014; B05C 11/036; B05C 17/00559
  USPC ...... 222/145.5–145.6, 52–69, 571, 333–334, 222/309–312, 368, 636
  See application file for complete search history.

(56) References Cited

U.S. PATENT DOCUMENTS

| | | | | |
|---|---|---|---|---|
| 4,303,108 A * | 12/1981 | Akers | ............... | B05C 17/00523 141/18 |
| 4,366,918 A * | 1/1983 | Naka | ................... | B01F 15/0454 222/134 |
| 4,545,507 A * | 10/1985 | Barall | ................... | F04B 53/147 222/137 |
| 4,979,639 A * | 12/1990 | Hoover | ................ | B67D 1/0037 137/625.19 |
| 5,127,547 A * | 7/1992 | Gerich | ................ | B01F 15/0454 222/137 |
| 5,372,283 A * | 12/1994 | Schmitkons | ............ | B01F 5/045 222/145.6 |
| 5,441,173 A * | 8/1995 | Koval | ...................... | A21C 5/00 222/276 |
| 5,733,597 A * | 3/1998 | Schmitkons | .......... | B05B 7/0861 118/324 |
| 5,816,445 A * | 10/1998 | Gardos | ............... | B01F 15/0454 222/1 |
| 6,050,450 A * | 4/2000 | Gardos | ................. | B01L 3/0227 222/1 |
| 6,164,568 A | 12/2000 | Muller et al. | | |
| 6,457,609 B1 * | 10/2002 | Keller | ............... | B05C 17/00509 222/137 |
| 6,575,331 B1 | 6/2003 | Peeler et al. | | |
| 6,662,969 B2 | 12/2003 | Peeler et al. | | |
| 6,676,642 B2 | 1/2004 | Beebe | | |
| 6,682,601 B1 * | 1/2004 | Beebe | ............... | B05C 17/00553 118/669 |
| 6,957,747 B2 | 10/2005 | Peeler et al. | | |
| 7,225,946 B2 * | 6/2007 | Gardos | ............... | F04B 11/0058 222/1 |
| 8,083,099 B2 * | 12/2011 | Meyer | .................... | A61C 5/062 222/1 |
| 8,256,645 B2 | 9/2012 | Beebe | | |
| 8,317,493 B2 * | 11/2012 | Laessle | ................... | F04B 13/02 222/135 |
| 8,608,091 B2 * | 12/2013 | Murray | ................. | B29B 7/7404 239/413 |
| 2004/0125688 A1 * | 7/2004 | Kelley | .................. | B01F 5/0077 366/152.2 |
| 2004/0256422 A1 * | 12/2004 | Penn | ..................... | F16K 11/076 222/504 |
| 2006/0208000 A1 * | 9/2006 | Murray | ................. | B29B 7/7404 222/135 |
| 2011/0084093 A1 * | 4/2011 | Nehren | ............... | B01F 7/00216 222/137 |
| 2013/0264358 A1 * | 10/2013 | Fallat, II | ................ | A45D 34/04 222/136 |
| 2014/0346190 A1 * | 11/2014 | Buck | ................. | B05C 17/0133 222/137 |
| 2016/0067656 A1 * | 3/2016 | Britcher | ................ | G01F 11/021 222/1 |

FOREIGN PATENT DOCUMENTS

| | | |
|---|---|---|
| WO | 2011025737 A1 | 3/2011 |
| WO | 2013066687 A1 | 5/2013 |

\* cited by examiner

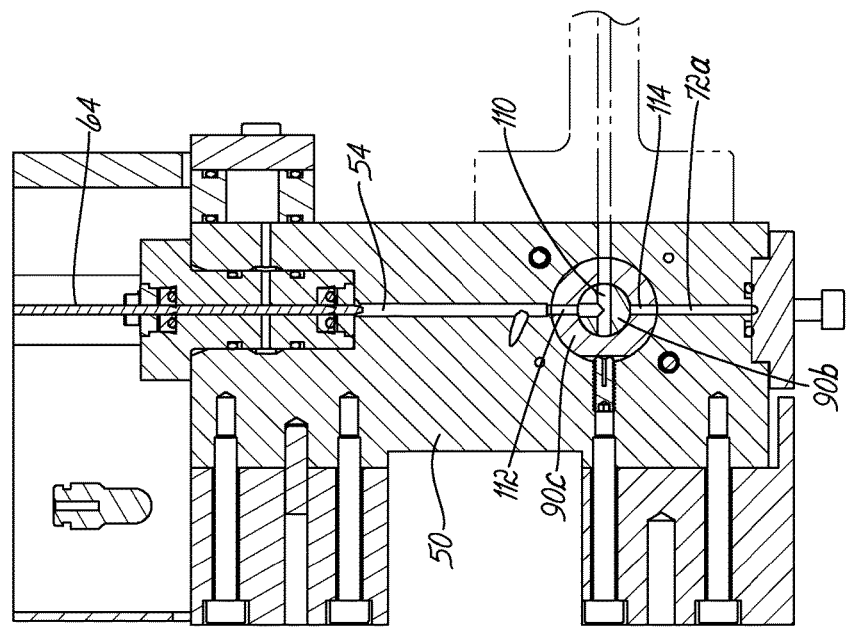
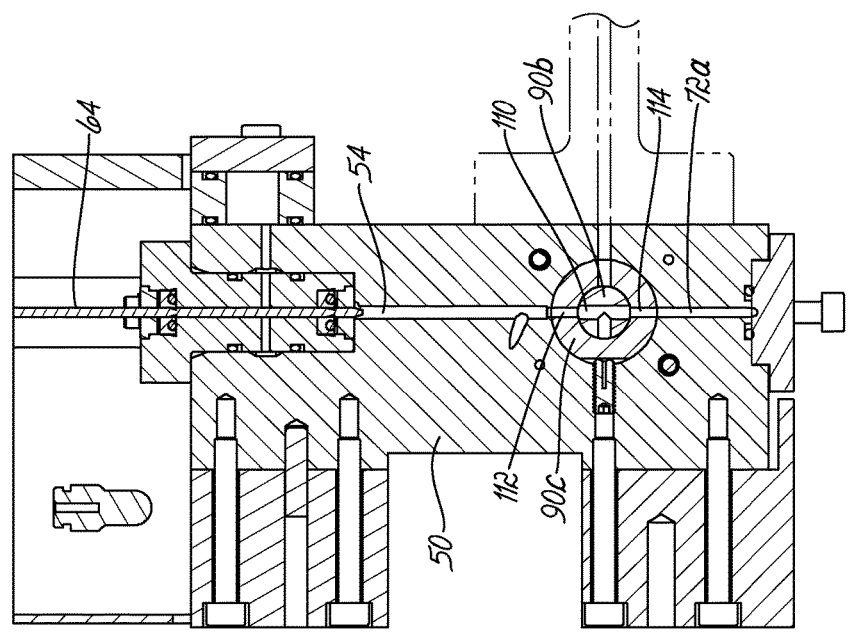

APPARATUS AND METHODS FOR DISPENSING SMALL BEADS OF VISCOUS MATERIAL

CROSS-REFERENCE TO RELATED APPLICATION

This application claims the benefit of U.S. Provisional Patent Application No. 62/046,499, filed on Sep. 5, 2014, the disclosure of which is incorporated by reference herein in its entirety.

TECHNICAL FIELD

The present invention generally relates to a dispensing apparatus and methods for mixing and dispensing two viscous fluids and, in particular, for accurately dispensing minute beads of mixed, viscous material.

BACKGROUND

In the dispensing field, it is common to mix two or more viscous fluid components to form a mixed fluid shortly before dispensing. For example, first and second viscous fluids, such as first and second liquid adhesive components, may be mixed to form a curable liquid adhesive for application onto a workpiece or substrate. The fluids may be initially contained in separate cartridges and directed under slight pressure to respective first and second fluid passageways. A metering rod in each passageway may be used to force or direct the first and second fluids from the first and second fluid passageways and into a mixing passage. The mixing passage will contain a static mixer in a nozzle. Accordingly, the first and second viscous fluids travel through the static mixer within the nozzle to dispense from a dispensing passageway at the nozzle tip for application onto the workpiece or substrate. While this particular example forms a curable liquid adhesive for dispensing, a number of fluid components may be similarly mixed to create a mixed fluid that includes any variety of desirable properties for use by the end-user.

Various challenges arise when attempting to dispense very small or minute beads of materials. For example, these minute beads of material may have a diameter of between about 0.2 mm and about 0.4 mm and a total volume of about 0.02 cc or more. When dispensing such small volumes of these viscous materials, in an application requiring high degrees of accuracy, the need for clean cutoff at the end of the dispensing cycle for a given bead is paramount as is the need to prevent any undesirable volume changes in the dispensed amount as the dispensed cycle ends.

SUMMARY

In an illustrative embodiment, the invention provides an apparatus for dispensing small beads of a viscous, mixed fluid material formed by first and second viscous fluids. The apparatus comprises a fluid dispensing body including a first fluid passageway and a second fluid passageway. The apparatus further comprises first and second metering rods, such that the first metering rod extends into the first fluid passageway, and the second metering rod extends into the second fluid passageway. A mixing passage includes a mixer and communicates with the first and second fluid passageways to receive the first and second viscous fluids from the first and second fluid passageways when the first and second metering rods are moved into the first and second fluid passageways. A dispensing passageway is in fluid communication with the mixing passage, and is configured to dispense a small bead of viscous, mixed fluid material formed by the mixed first and second viscous fluids. A control operates to retract the first and second metering rods by a distance sufficient to prevent drooling of the viscous, mixed fluid material outward from the dispensing passageway at the end of a dispensing cycle.

Embodiments of the invention include various other alternative or additional aspects important to carrying out objectives and improvements. For example, the apparatus may further comprise a carriage support, a carriage mounted for moving in a reciprocating manner relative to the carriage support, and an actuator coupled to the carriage for moving the carriage in the reciprocating manner. The first and second metering rods are coupled to the carriage for simultaneously moving in the reciprocating manner. The mixing passage communicates with the first and second fluid passageways to receive the first and second viscous fluids from the first and second fluid passageways when the first and second metering rods are simultaneously moved into the first and second fluid passageways by actuation of the carriage with the actuator. The control is coupled to the actuator. In a further example, a rotary valve is positioned between the first and second metering rods and the mixing passage, and is mounted for rotation between a first position allowing fluid communication respectively between the first and second fluid passageways and the mixing passage and a second position preventing fluid communication respectively between the first and second fluid passageways and the mixing passage. The control operates to simultaneously retract the first and second metering rods before rotating the rotary valve between the first position and the second position. The first and second metering rods and the first and second passageways are sized to dispense the first and second viscous fluids in a ratio exceeding 1:1 and more preferably between 1:1 and 10:1. The apparatus is especially advantageous for dispensing very minute beads of viscous material in very low volumes. For example, the beads can have a diameter of 0.2 mm to 0.4 mm. The total volume dispensed in a bead may be as low as about 0.002 cc. The ratio of the total passageway volume upstream of the mixing passage to the dispensed volume of a bead may be 200:1 or less.

In another aspect, the invention provides a method for dispensing small beads of a viscous, mixed fluid material formed by first and second viscous fluids. For example, in an illustrative embodiment the method includes moving first and second metering rods respectively into first and second fluid passageways to direct the first and second viscous fluids from the first and second fluid passageways into a mixing passage. The first and second viscous fluids are mixed with a mixer in the mixing passage. A small bead of viscous, mixed fluid material formed by the mixed first and second viscous fluids is dispensed. The first and second metering rods are then retracted by a distance sufficient to cut off the dispensing of the small bead and prevent drooling of the viscous, mixed fluid material. In one aspect, the first and second metering rods are moved simultaneously respectively into the first and second fluid passageways and the first and second metering rods are simultaneously retracted. As a further aspect, after retracting the first and second metering rods, a valve positioned between the first and second metering rods and the mixing passage may be rotated from a first position allowing fluid communication respectively between the first and second fluid passageways and the mixing passage to a second position preventing fluid communication respectively between the first and second fluid passageways and the mixing passage. The methods of this invention may also or alternatively include other aspects as summarized above and/or as described in more detail herein.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

FIG. 3A is a cross sectional view taken along line 3-3 of FIG. 2A, and showing the rotary valve in an open condition.

FIG. 3B is a cross sectional view similar to FIG. 3A, but illustrating the rotary valve in a closed condition.

DETAILED DESCRIPTION

Figure 1:
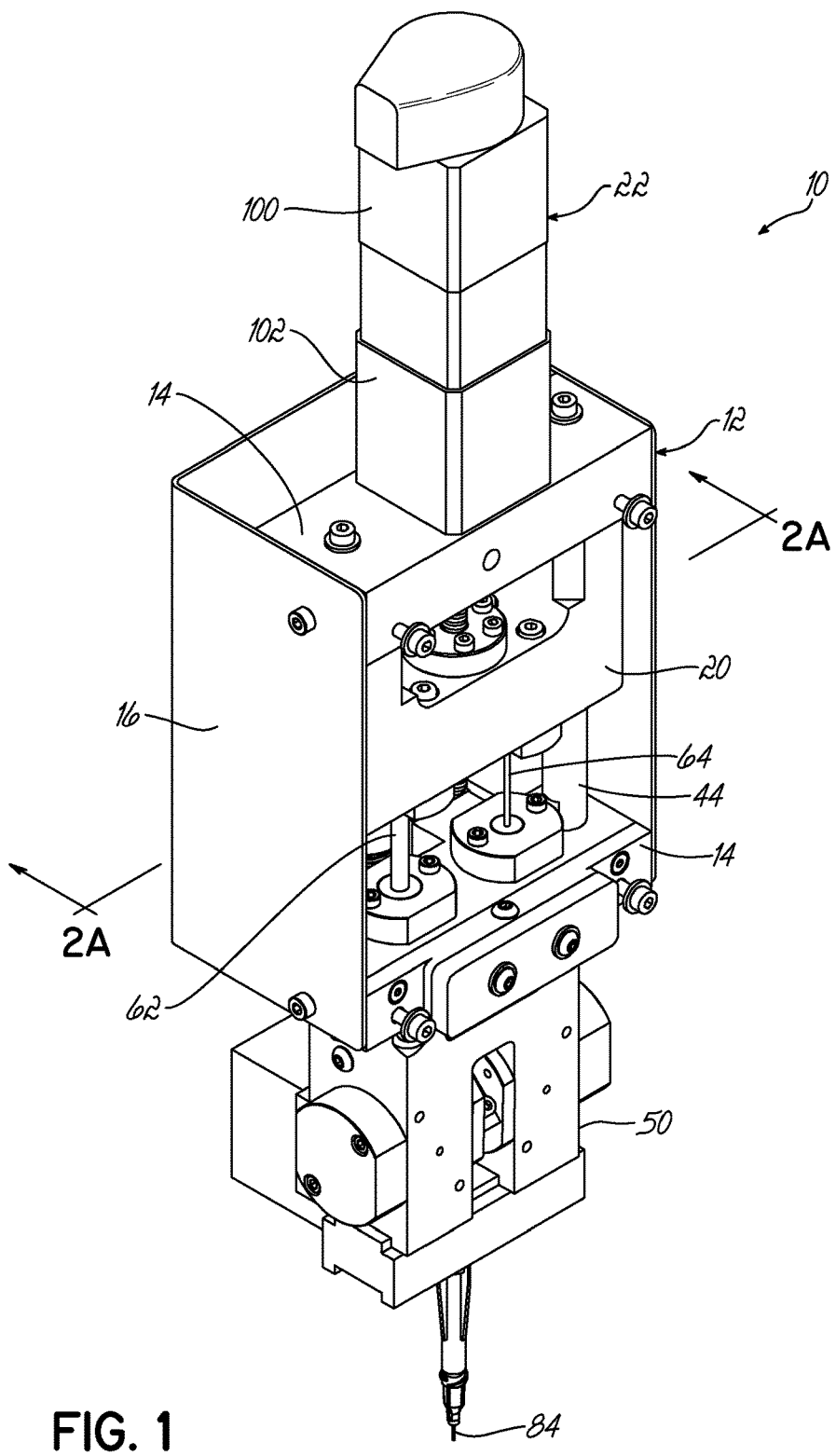
FIG. 1 is a perspective view illustrating a dispenser or apparatus constructed in accordance with one illustrative embodiment of the invention.
Figure 2A:
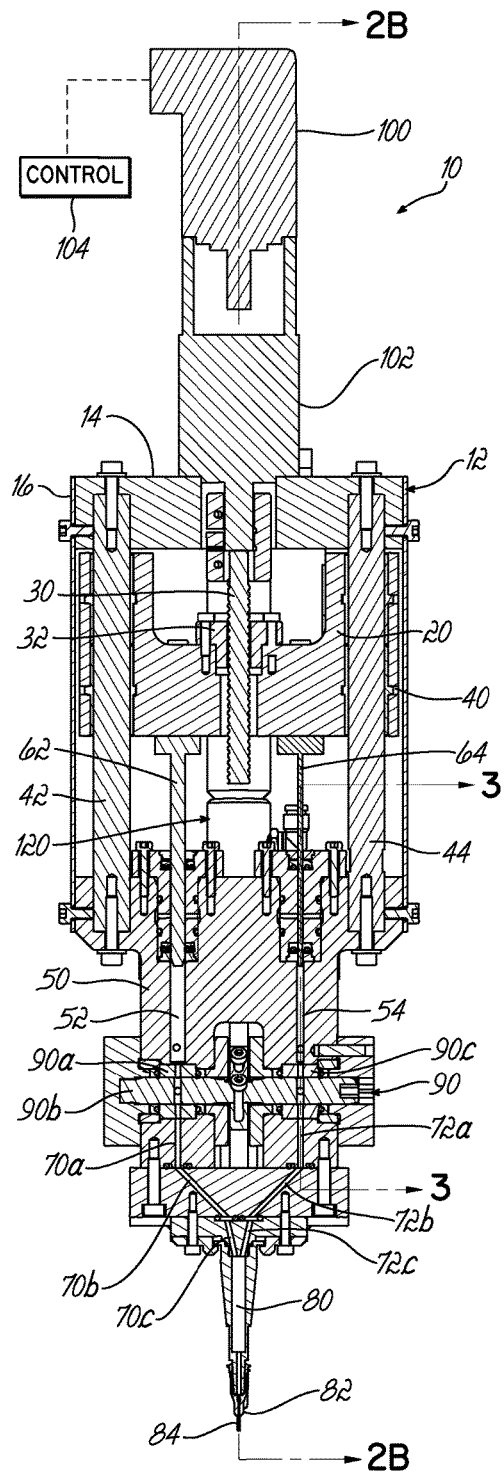
FIG. 2A is a cross sectional view taken generally along line 2A-2A of FIG. 1.
Figure 2B:
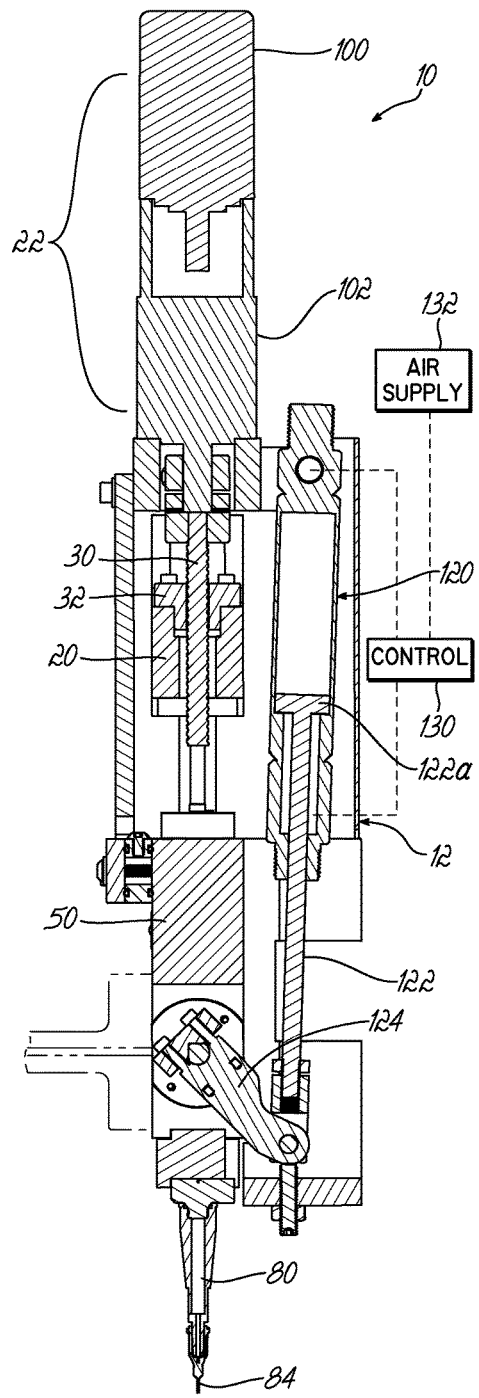
FIG. 2B is a cross sectional view taken along line 2B-2B of FIG. 2A.

Referring generally to FIG. 1, an apparatus 10 is shown and is especially useful for dispensing minute beads of a viscous, mixed fluid material. Such beads of adhesive may be required in, for example, electronics manufacturing applications such as adhering display screens onto smart phones or tablet devices. The apparatus 10 generally includes a carriage support 12 which, for example, can comprise housing and other support structural components such as mounting blocks 14 and an outer cover 16. The apparatus 10 further includes a carriage 20 mounted for reciprocating movement relative to the carriage support 12. An actuator 22 is coupled to the carriage 20 for moving the carriage 20 in a reciprocating manner, i.e., in an up and down direction as viewed in FIG. 1. Referring also to FIGS. 2A and 2B, the actuator 22 is coupled to the carriage 20 by way of a ball screw 30 and ball nut 32 and the carriage 20 slides on bearings 40 and is guided along rods 42, 44. Alternatively, the apparatus 10 may include more than one carriage 20. Similarly, the apparatus 10 may include more than one actuator 22. For example, an apparatus may include first and second carriages coupled to first and second actuators, respectively. A fluid dispensing body 50 is fixed to the carriage support 12 and includes first and second fluid passageways 52, 54. First and second metering rods 62, 64 are fixed to the carriage 20 for simultaneously moving in the reciprocating manner, such that the first metering rod 62 extends into the first fluid passageway 52, and the second metering rod 64 extends into the second fluid passageway 54. The first and second fluid passageways 52, 54 communicate with additional downstream passageways 70a, 70, 70c and 72a, 72b, 72c that lead to a mixing passage 80 holding a mixing element (not shown) such as a static mixer. Finally, a dispensing passageway 82 is located in a nozzle tip 84 to dispense the mixed, viscous fluid material comprised of the first and second viscous fluids.

A rotary valve 90 comprised of respective stationary valve elements 90a, 90c and a rotatable valve element 90b is located between the first and second fluid passageways 52, 54 and the mixing passage 80 to control the flow of the first and second viscous fluids in an on/off manner and without either pushing or pulling viscous material downstream of the rotary valve 90 as would often be the case if using a reciprocating valve elements. The actuator 22 may be comprised of a servomotor 100 coupled with a gear reducer 102 for rotating the ball screw 30. A control 104 is provided for operating the servomotor 100 to move the carriage 20 as needed for completing the dispense cycles, as desired. In this manner, the carriage 20 will travel along the ball screw 30, via the ball nut 32, and simultaneously move or extend the first and second metering rods 62, 64 into the first and second fluid passageways 52, 54. As long as the rotary valve element 90b is in the dispensing position shown in FIG. 2A, the fluid will be extruded from the first and second fluid passageways 52, 54 through the rotary valve 90 and through the downstream passageways 70a, 70b, 70c and 72a, 72b, 72c into the mixing passage 80 such that the fluid is ultimately dispensed as a minute bead from the dispensing passageway 82 at the nozzle tip 84. As discussed above, an apparatus may include more than one carriage and/or more than one actuator. An apparatus including, for example, first and second carriages and first and second actuators, the carriages may be configured to move simultaneously or independently. Accordingly, the first and second metering rods 62, 64 may move simultaneously or independently into the first and second fluid passageways 52, 54.

FIGS. 3A and 3B better illustrate the two positions of the rotary valve element 90b. That is, FIG. 3A illustrates the dispensing position of the rotary valve element 90b in which the fluid passageway 54 is aligned with a fluid passageway 110 in the valve element 90b such that the fluid flows through passageways 112, 114 to the downstream passageway 72a. FIG. 3B illustrates the rotary valve element 90b rotated 90° to a non-dispensing or recharge position in which the passageway within the rotary valve element 90b is misaligned with the downstream passageways 114, 72a. Therefore, the fluid from a supply cartridge (not shown) is directed upwardly into the fluid passageways 112, 54 to "recharge" that fluid passageway 54 for the next bead dispense cycle.

Figure 4A:
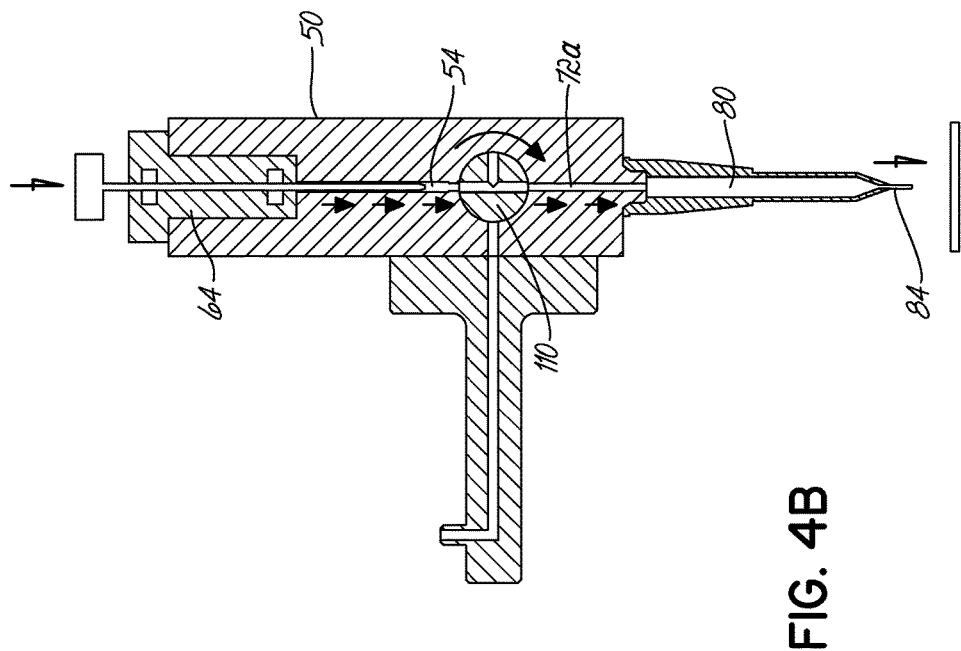
FIGS. 4A and 4B are schematic illustrations illustrating the closed and open valve conditions.
Figure 4B:
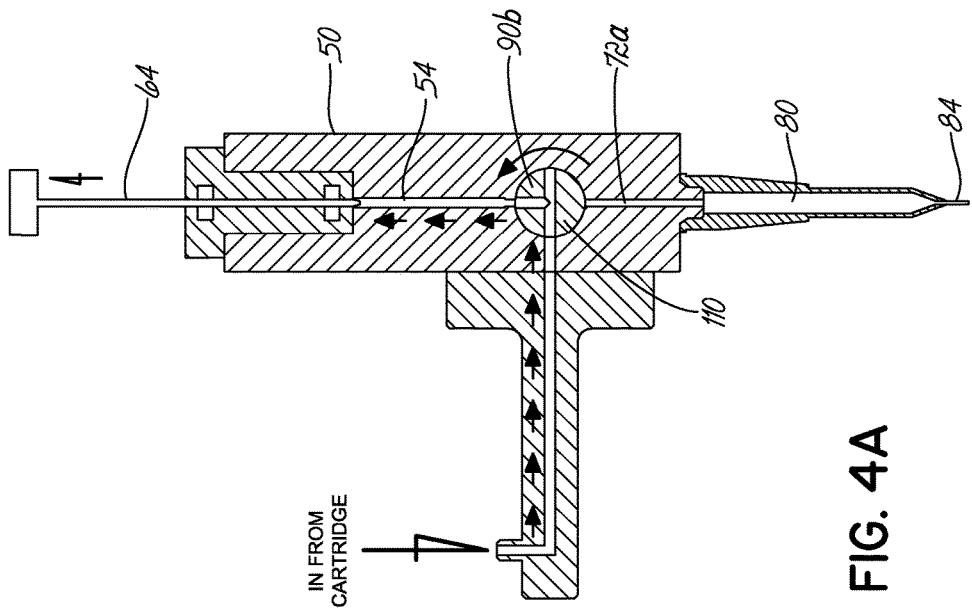

Operation of the valve 90 is illustrated further in the schematic views of FIGS. 4A and 4B. As shown in FIG. 4A, the rotary valve element 90b is in the non-dispensing or recharge position in which fluid from a supply such as a cartridge flows into the fluid dispensing body 50 and into the fluid passageway 54 to fill or recharge the passageway 54 with additional fluid after a dispense cycle in order to prepare for the next dispense cycle. FIG. 4B illustrates the rotary valve element 90b rotated to an open or dispense position in which the passageway 110 in the rotary valve element 90b aligns with the fluid passageways 54, 72a both upstream and downstream of the rotary valve 90. While the valve element 90b is in this position, the metering rod 64, is extended or moved through the fluid passageway 54 to extrude the fluid through the rotary valve 90 and the downstream passageways 72a, 72b, 72c, (FIG. 2A) and subsequently into the mixing passage 80. At the end of a dispensing cycle, and before rotating the rotary valve element 90b from the dispensing position shown in FIGS. 2A, 3A and 4B to the recharge position shown in FIGS. 3B and 4A, the metering rods 52, 54 are retracted slightly, such as by about 0.030 inch. This relieves the slight positive pressure in the downstream passageways 70a, 70b, 70c and 72a, 72b, 72c (FIG. 2A) as well as the mixing passage 80 and dispensing passageway 82 in order to snuff back the fluid material at the nozzle tip 84 and prevent drooling at the end of a dispense cycle. Drooling will typically occur because of positive pressure and in applications that require very minute amounts of fluid dispensing, even a very small amount of drooling will negatively affect the application. For example, these are applications that require a total dispensed volume per cycle of, for example, as low as 0.002 cc.

Referring again to FIG. 2B, the assembly and actuator for rotating the valve is best shown. This assembly includes an air cylinder actuator 120 with an internal piston rod 122 carrying a piston 122a operated by air pressure to move up and down and thereby pivot a rotating arm or lever 124. The lever is coupled to the rotating valve element 90b and rotates the valve element 90b between the two positions previously discussed. The air cylinder 120 is controlled by any suitable control 130, coupled with a pressurized air supply 132 for selectively introducing pressurized air on opposite sides of the piston 122a to thereby reciprocate the piston 122a and rod 122 in opposite directions and, as a result, rotate the lever 124 and the valve element 90b in opposite directions, as discussed above.

The ratio of the total passageway volume upstream of the mixing passage 80 to the dispensed volume of a bead is 200:1 or less. Clearances between the metering rods 62, 64 and respective passageways 52, 54 should be 0.010 in. or less. Also, any areas for trapping air bubbles of any size should be eliminated, and any air should be bled from the fluid paths in the apparatus 10 before use.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. An apparatus for dispensing small beads of a viscous, mixed fluid material formed by first and second viscous fluids, the apparatus comprising:
   a fluid dispensing body including a first fluid passageway and a second fluid passageway;
   first and second metering rods, the first metering rod extending into the first fluid passageway, and the second metering rod extending into the second fluid passageway, the first and second metering rods extending into the first and second fluid passageways, respectively, in a dispense direction;
   a mixing passage including a mixer, the mixing passage communicating with the first and second fluid passageways to receive the first and second viscous fluids from the first and second fluid passageways when the first and second metering rods are moved into the first and second fluid passageways;
   a rotary valve positioned between the first and second metering rods and the mixing passage, the rotary valve having a single valve body that defines a first rotary passage and a second rotary passage, both the first rotary passage and the second rotary passage including a dispense portion that extends through the rotary valve and a recharge portion that extends from an exterior of the rotary valve to the dispense portion, the rotary valve configured to rotate between a first position, allowing fluid communication between the first fluid passageway and the mixing passage via the dispense portion of the first rotary passage in the dispense direction and allowing fluid communication between the second fluid passageway and the mixing passage via the dispense portion of the second rotary passage in the dispense direction, and a second position, preventing fluid communication between the first and second fluid passageways and the mixing passage;
   a dispensing passageway in fluid communication with the mixing passage, and configured to dispense a small bead of viscous, mixed fluid material formed by the mixed first and second viscous fluids; and
   a control configured to extend and retract the first and second metering rods, and further configured to rotate the rotary valve between the first position and the second position.

2. The apparatus of claim 1, further comprising:
   a carriage support;
   a carriage mounted for moving in a reciprocating manner relative to the carriage support; and
   an actuator coupled to the carriage for moving the carriage in the reciprocating manner,
   wherein the first and second metering rods are coupled to the carriage for simultaneously moving in the reciprocating manner, the mixing passage communicates with the first and second fluid passageways to receive the first and second viscous fluids from the first and second fluid passageways when the first and second metering rods are simultaneously moved into the first and second fluid passageways by actuation of the carriage with the actuator, and the control is coupled to the actuator.

3. The apparatus of claim 1, wherein the control is further configured to simultaneously retract the first and second metering rods before rotating the rotary valve between the first position and the second position.

4. The apparatus of claim 1, wherein the first and second metering rods and the first and second fluid passageways are sized to dispense the first and second viscous fluids in a ratio exceeding 1:1.

5. The apparatus of claim 4, wherein the ratio is between 1:1 and 10:1.

6. The apparatus of claim 1, wherein the dispensing passageway is sized to dispense a minute bead of the viscous, mixed fluid material with a diameter of 0.2 to 0.4 mm.

7. The apparatus of claim 1, wherein the ratio of the total passageway volume upstream of the mixing passage to the dispensed volume is 200:1 or less.

8. The apparatus of claim 1, wherein the first metering rod has a diameter that is different from a diameter of the second metering rod.

9. The apparatus of claim 1, wherein the first fluid passageway is parallel to the second fluid passageway.

10. The apparatus of claim 1, further comprising:
    a first downstream passageway being positioned between the first fluid passageway and the mixing passage, the first downstream passageway being angled relative to the first fluid passageway; and
    a second downstream passageway being positioned between the second fluid passageway and the mixing passage, the second downstream passageway being angled relative to the second fluid passageway.

11. The apparatus of claim 10, wherein the angle between the first downstream passageway and the first fluid passageway is obtuse, and wherein the angle between the second downstream passageway and the second fluid passageway is obtuse.

12. The apparatus of claim 11, wherein the angle between the first downstream passageway and the first fluid passageway is equal to the angle between the second downstream passageway and the second fluid passageway.

13. The apparatus of claim 1, wherein the recharge portion of the first rotary passage is perpendicular to the dispense portion of the first rotary passage, and wherein the recharge portion of the second rotary passage is perpendicular to the dispense portion of the second rotary passage.

14. A method for dispensing small beads of a viscous, mixed fluid material formed by first and second viscous fluids, the method comprising:
 moving first and second metering rods respectively into first and second fluid passageways to direct the first and second viscous fluids from the first and second fluid passageways into a mixing passage, the first and second metering rods directing the first and second viscous fluids in a dispense direction;
 mixing the first and second viscous fluids with a mixer in the mixing passage;
 dispensing a small bead of viscous, mixed fluid material formed by the mixed first and second viscous fluids;
 retracting the first and second metering rods by a distance sufficient to cut off the dispensing of the small bead and prevent drooling of the viscous, mixed fluid material; and
 after retracting the first and second metering rods, rotating a valve positioned between the first and second metering rods and the mixing passage from a first position to a second position, the valve having a single valve body that defines a first rotary passage and a second rotary passage, both of the first rotary passages and the second rotary passages including a dispense portion that extends through the valve and a recharge portion that extends from an exterior of the valve to the dispense portion, wherein in the first position, fluid communication is allowed between the first fluid passageway and the mixing passage via the dispense portion of the first rotary passage in the dispense direction and fluid communication is allowed between the second fluid passageway and the mixing passage via the dispense portion of the second rotary passage in the dispense direction, and wherein in the second position, fluid communication is prevented between the first and second fluid passageways and the mixing passage.

15. The method of claim 14, wherein moving first and second metering rods includes simultaneously moving first and second metering rods and retracting the first and second metering rods includes simultaneously retracting the first and second metering rods.

16. The method of claim 14, wherein the first and second viscous fluids are directed from the first and second fluid passageways in a ratio exceeding 1:1.

17. The method of claim 16, wherein the ratio is between 1:1 and 10:1.

18. The method of claim 14, wherein the small bead of the viscous, mixed fluid material has a diameter of 0.2 to 0.4 mm.

19. The method of claim 14, wherein the ratio of the total passageway volume upstream of the mixing passage to the dispensed volume is 200:1 or less.

20. The method of claim 14, wherein the first metering rod has a diameter that is different from a diameter of the second metering rod.

* * * * *